(12) United States Patent
Baldwin et al.

(10) Patent No.: US 11,854,434 B2
(45) Date of Patent: Dec. 26, 2023

(54) VIRTUAL REALITY VEHICLE OPERATION SIMULATION

(71) Applicants: Danny Baldwin, Halifax (CA); Shawn Greene, Halifax (CA)

(72) Inventors: Danny Baldwin, Halifax (CA); Shawn Greene, Halifax (CA)

( * ) Notice: Subject to any disclaimer, the term of this patent is extended or adjusted under 35 U.S.C. 154(b) by 0 days.

(21) Appl. No.: 17/352,271

(22) Filed: Jun. 19, 2021

(65) Prior Publication Data

US 2022/0406212 A1     Dec. 22, 2022

(51) Int. Cl.
  *G09B 9/052*       (2006.01)
  *G06F 3/0346*      (2013.01)
  *A63F 13/803*      (2014.01)
  *A63F 13/812*      (2014.01)
  *G06F 3/0354*      (2013.01)
  *G06F 3/0338*      (2013.01)

(52) U.S. Cl.
  CPC ........... *G09B 9/052* (2013.01); *G06F 3/0346* (2013.01); *A63F 13/803* (2014.09); *A63F 13/812* (2014.09); *A63F 2300/8011* (2013.01); *A63F 2300/8017* (2013.01); *A63F 2300/8082* (2013.01); *G06F 3/0338* (2013.01); *G06F 3/03547* (2013.01); *G06F 3/03549* (2013.01)

(58) Field of Classification Search
  CPC ............................................... A63F 2300/8082
  See application file for complete search history.

(56) References Cited

U.S. PATENT DOCUMENTS

| 5,823,876 A * | 10/1998 | Unbehand | A63F 13/803 463/37 |
| 6,217,449 B1 * | 4/2001 | Kaku | G06F 3/01 463/7 |
| 6,511,442 B1 * | 1/2003 | Lathan | A61B 5/16 600/595 |
| 10,977,956 B1 * | 4/2021 | Madison | G09B 9/052 |
| 2002/0052724 A1 * | 5/2002 | Sheridan | G09B 9/05 703/8 |
| 2007/0085298 A1 * | 4/2007 | Balajadia | B62K 5/05 280/282 |
| 2011/0074768 A1 * | 3/2011 | Takayama | A63F 13/428 345/419 |

(Continued)

FOREIGN PATENT DOCUMENTS

| JP | H1014987 A * | 1/1998 | ............ G06F 1/163 |
| WO | WO-03103761 A1 * | 12/2003 | ............ G06F 1/163 |
| WO | WO-2021163418 A1 * | 8/2021 | |

OTHER PUBLICATIONS

C.E. Brubaker, C.A. McLaurin, and I.S. McClay, "Effects of side slope on wheelchair performance", 1986, J. Rehab. Res. Dev., pp. 55-58, https://www.rehab.research.va.gov/jour/86/23/2/pdf/brubaker.pdf (Year: 1986).*

(Continued)

*Primary Examiner* — James B Hull
(74) *Attorney, Agent, or Firm* — Seattle Patent Group LLC; James Haugen

(57) ABSTRACT

An interactive vehicle simulation system having a virtual reality engine that generates a virtual operating environment that includes a user operated vehicle having a plurality of wheel types, a vehicle position, vehicle orientation, vehicle velocity and vehicle acceleration.

1 Claim, 8 Drawing Sheets

(56) References Cited

U.S. PATENT DOCUMENTS

| | | | |
|---|---|---|---|
| 2016/0242977 A1* | 8/2016 | Richter | H02P 31/00 |
| 2016/0250930 A1* | 9/2016 | Collins | B60L 15/2036 |
| | | | 701/22 |
| 2016/0300390 A1* | 10/2016 | Malafeew | G16H 20/30 |
| 2018/0315244 A1* | 11/2018 | Thompson | H04N 5/23293 |
| 2019/0099675 A1* | 4/2019 | Khan | A63F 13/213 |
| 2019/0142663 A1* | 5/2019 | You | B60T 8/245 |
| | | | 188/179 |
| 2020/0121526 A1* | 4/2020 | Cooper | A61G 5/1075 |
| 2020/0237586 A1* | 7/2020 | Choi | A61G 5/1016 |
| 2020/0306624 A1* | 10/2020 | Graf | A63F 13/90 |
| 2021/0016172 A1* | 1/2021 | Huang | A63F 13/56 |

OTHER PUBLICATIONS

S. Miller, J.A. Molino, J.F. Kennedy, A.K. Emo, and A. Do, "Segway Rider Behavior: Speed and Clearance Distance in Passing Sidewalk Objects", 2008, Transp. Res. Rec., pp. 125-132, https://doi.org/10.3141/2073-14 (Year: 2008).*

A. Alshaer, H. Regenbrecht, and D. O'Hare, "Immersion factors affecting perception and behaviour in a virtual reality power wheelchair simulator", May 2016, Appl. Ergon., pp. 1-12, https://doi.org/10.1016/j.apergo.2016.05.003 (Year: 2016).*

R.M.A. van der Slikke, M.A.M. Berger, D.J.J. Bregman, and H.E.J. Veeger, "From big data to rich data: The key features of athlete wheelchair mobility performance", 2016, J. Biomech., pp. 3340-3346, https://doi.org/10.1016/j.jbiomech.2016.08.022 (Year: 2016).*

Y. Sergeeva, "A Virtual Reality Based Powered Wheelchair Simulator", Jun. 2017, WMU, pp. 1-76, https://scholarworks.wmich.edu/masters_theses/1123/ (Year: 2017).*

N.W. John, S.R. Pop, T.W. Day, P.D. Ritsos, and C.J. Headleand, "The Implementation and Validation of a Virtual Environment for Training Powered Wheelchair Manoeuvres", May 2018, IEEE Trans. Vis. Comput. Graph., pp. 1867-1868, http://dx.doi.org/10.1109/TVCG.2017.2700273 (Year: 2018).*

B. Wieczorek and M. Kukla, "Biomechanical Relationships Between Manual Wheelchair Steering and the Position of the Human Body's Center of Gravity", Aug. 2020, J. Biomech. Eng., pp. 1-8, https://doi.org/10.1115/1.4046501 (Year: 2020).*

* cited by examiner

VIRTUAL REALITY VEHICLE OPERATION SIMULATION

FIELD

The instant disclosure pertains to vehicle simulation, including a virtual reality feature.

BACKGROUND

Virtual reality (VR) is currently being used in many situations, including video games and manufacturing aid. The value of VR is its ability to simulate real-life situations. One potential use is to create training simulations where a user is provided an opportunity to perform repetitive actions conveniently. The better a simulation is able to reproduce aspects of real life, the better the results will be in gaining real-life skills.

One such area where VR simulations can be improved is in controlling vehicles. While there are VR video games that simulate race car driving, there is a shortfall of VR simulations that can be used to train skills for certain vehicles.

SUMMARY

An interactive vehicle simulation system comprising a processor, a display having a ninety-degree field of view or greater, a virtual reality engine that generates, by utilizing the processor, instructions for displaying a virtual vehicle operating environment, a virtual vehicle operating environment including at least a portion of a user operated vehicle having a plurality of wheel types, a vehicle position, vehicle orientation, vehicle velocity and vehicle acceleration, and a user interface for operatively controlling the user operated vehicle.

A processor-readable non-transitory storage media comprising a display engine for generating visual images, by utilizing a processor and a display, having a ninety degree field of view or greater on a display, a virtual reality engine that generates, by utilizing a processor, instructions for displaying a virtual vehicle operating environment and a virtual vehicle operating environment including at least a portion of a user operated vehicle having a plurality of wheel types, a vehicle position, vehicle orientation, vehicle velocity and vehicle acceleration.

A method of operating an interactive vehicle simulation system comprising utilizing a user interface to interact with a virtual reality engine that generates processor instructions for displaying a virtual vehicle operating environment and operating a vehicle having a plurality of wheel types in the virtual vehicle operating environment, the virtual vehicle operating environment including at least a portion of the vehicle, a vehicle position, vehicle orientation, vehicle velocity and vehicle acceleration.

BRIEF DESCRIPTION OF THE FIG.S

DETAILED DESCRIPTION

Figure 1:
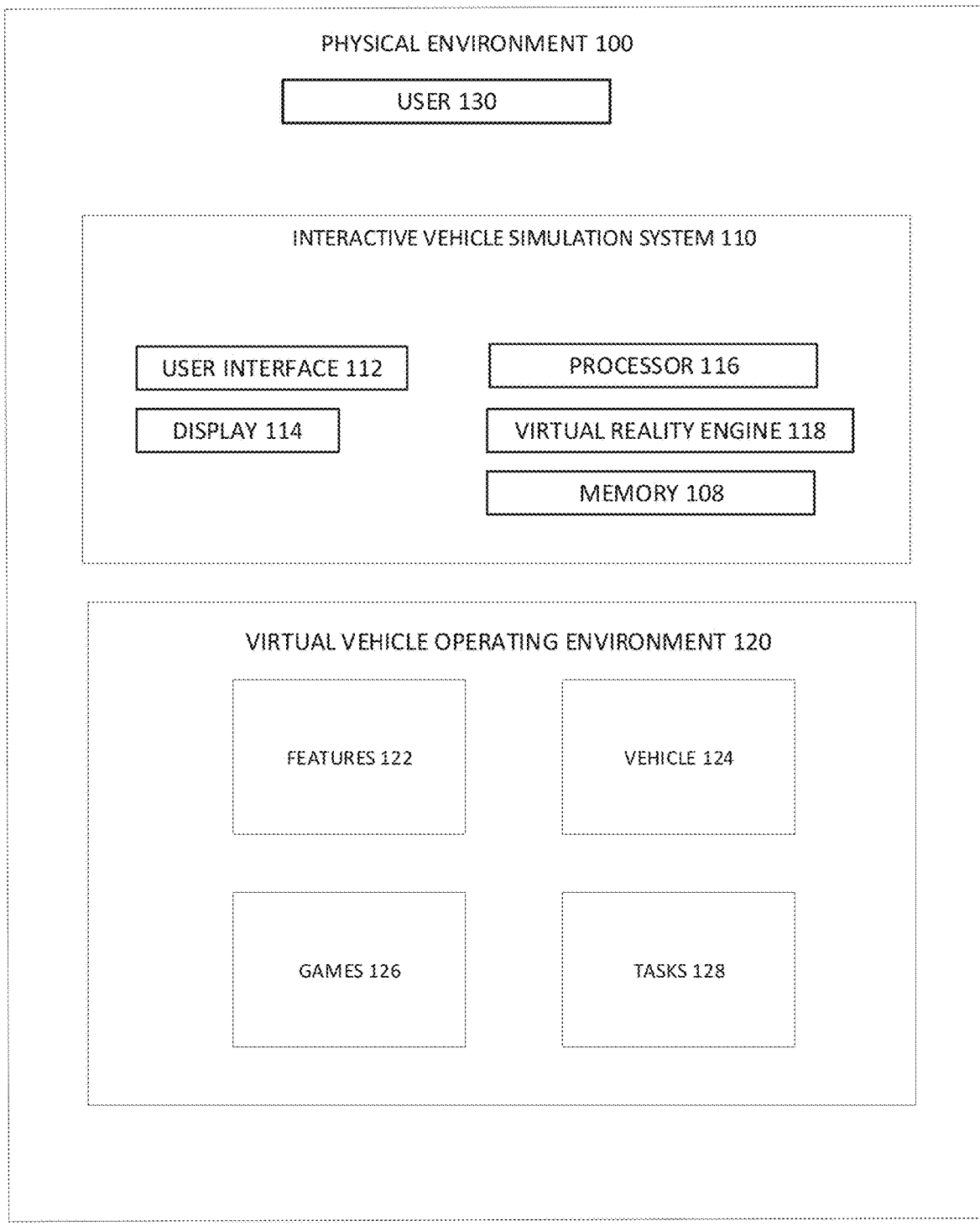
FIG. 1 is an illustrative embodiment of a block diagram of an interactive vehicle simulation system.

In the following detailed description, reference is made to the accompanying drawings, which form a part hereof. In the drawings, similar symbols typically identify similar components, unless context dictates otherwise. Drawings are not to scale unless otherwise noted. The illustrative embodiments described in the detailed description and drawings are not meant to be limiting. Other embodiments may be utilized, and other changes may be made, without departing from the spirit or scope of the subject matter presented here.

The illustrative embodiments recognize that many vehicle types have not been represented sufficiently in virtual reality simulations to allow for users to train. The illustrative embodiments recognize and take into account that currently available virtual vehicle environment systems do not take into account vehicles having different wheel types. Instead, these systems use a uniform set of wheel values to simulate a vehicle operation.

Thus, the illustrative embodiments provide an interactive vehicle simulation system comprising: a processor; a display having a ninety-degree field of view or greater; a virtual reality engine that generates, by utilizing the processor, instructions for displaying a virtual vehicle operating environment; a virtual vehicle operating environment including at least a portion of a user-operated vehicle having a plurality of wheel types, a vehicle position, vehicle orientation, vehicle velocity and vehicle acceleration; and a user interface for operatively controlling the vehicle.

FIG. 1 shows the components of one embodiment. In this embodiment, Interactive Vehicle Simulation System 110 and User 130 are located in Physical Environment 100. Interactive Vehicle Simulation System 110 allows User 130 to interact with a virtual environment generated by virtual reality engine 118. Virtual Reality Engine 118 utilizes Processor 116 and Memory 108 to generate Virtual Vehicle Operating Environment 120 and provide images and video of the Virtual Vehicle Operating Environment 120 on Display 114 for User 130 to view. User Interface 112 provides User 130 with an ability to interact with the Virtual Vehicle Operating Environment 120.

In these illustrative examples, Virtual Reality Engine 118 may be implemented in hardware, software, or a combination of the two. In these illustrative examples, the hardware may take the form of a circuit system, an integrated circuit, an application-specific integrated circuit, a programmable logic device, or some other suitable type of hardware configured to perform a number of operations. With a programmable logic device, the device is configured to perform a number of operations. The device may be reconfigured at a later time or may be permanently configured to perform a number of operations. Examples of programmable logic devices include, for example, a programmable logic array, a programmable array logic, a field-programmable logic array, a field-programmable gate array, and other suitable hardware devices. Additionally, the processes may be implemented in organic components integrated with inorganic components or may be comprised entirely of organic components excluding a human being. For example, the processes may be implemented as circuits in organic semiconductors.

In these illustrative examples, Virtual Reality Engine 118 may be implemented in a computer system. The computer system may be one or more computers. When more than one computer is present in the computer system, those computers may communicate with each other over a communications medium such as a network.

Virtual Reality Engine 118 may also be stored in processor-readable non-transitory media such as a storage unit (also called a computer-readable storage unit) where one or more devices are configured to store computer-readable information. The storage unit may include a computer-readable memory and a persistent storage (also called a computer-readable persistent storage, storage media, or computer-readable storage media). The persistent storage may be one or more computer-readable storage devices that are non-transitory and not merely transitory electronic or electromagnetic signals. The persistent storage may include one or more (non-transitory) storage media or a distributed group of (non-transitory) storage media. One example of a distributed group of (non-transitory) storage media is a cloud storage.

In these illustrative examples, Display 114 may a head-mounted display device such as a headgear and may be configured to display the virtual vehicle operating environment. User Interface 112 may include any of a rollerball, a touchpad, a joystick, headgear or any other input device. In an embodiment, User Interface 112 may be a pair of hand controllers. An example of using such a pair of hand controllers is where a pair of hand controllers are used to interact with a corresponding pair of virtual wheels and where movement of a hand controller results in a complementary movement of a corresponding virtual wheel.

Interactive Vehicle Simulation System 110 includes multiple cameras placed in multiple positions to define a tracking area. Laser rangefinders are used to compare positions measured with the cameras. Active marker LEDs are used to define trackable positions. An example of User Interface 112 with a pair of hand controllers is the Vive Pro line of products produced by High Tech Computer (HTC) Corporation of Taiwan. The Vive Tracker is an example of an active LED marker.

Images or video may be generated as part of the interaction of User 130 with Virtual Vehicle Operating Environment 120. Virtual Vehicle Operating Environment 120 may be displayed with a field of view greater than ninety degrees.

Figure 2:
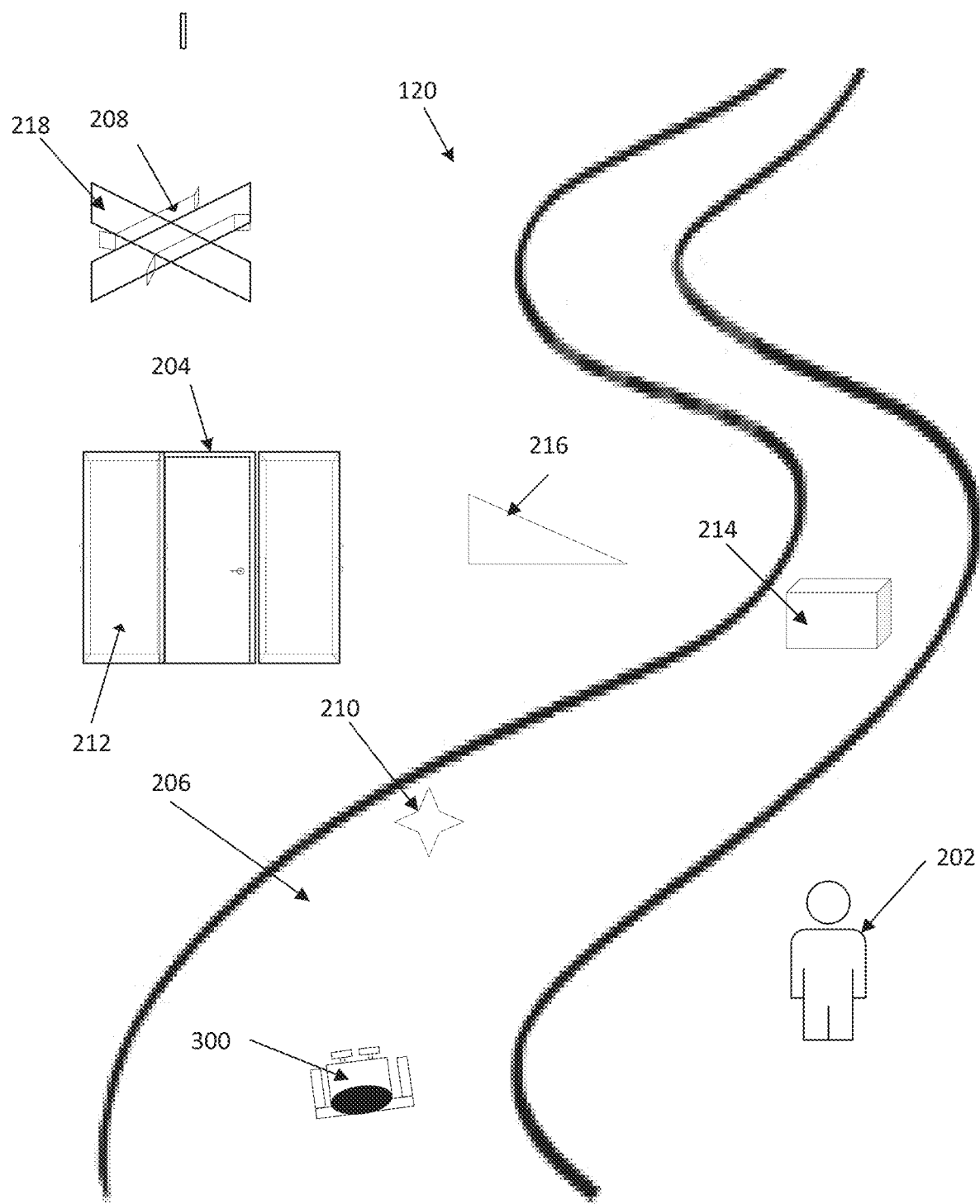
FIG. 2 is an illustration of a virtual vehicle operating environment, according to one embodiment.

FIG. 2 shows Virtual Vehicle Operating Environment 120 may have a number of Features 122 within the environment, according to one embodiment. Features 122 may include, for example, People 202, robots (not shown) Door 204, Road 206, River 208, Ground Condition 210, Wall 212, Block 214, Ramp 216, and Bridge 218. Each of Features 122 may have characteristics that simulate, in part, their physical counterpart. For example, Door 204 may define a passageway that would allow a vehicle of smaller dimension to pass through if the vehicle were guided to avoid hitting Door 204 or Wall 212.

Road 206 may generally have a surface with good traction that would allow the motive wheels of User Operated Vehicle 300 to maintain forward propulsion in direct relation to wheel rotation. Ground Condition 210 may have several embodiments, which may include adverse ground conditions such as gravel, oil slicks, and water. Each of these adverse ground conditions may provide lower traction, through slippage, than a road alone and thus may cause lower forward propulsion in relationship to the distance a point on the circumference of a wheel will travel during rotation. In other words, during slippage, a wheel will rotate and not cause the vehicle to move forward.

Bridge 218, River 208, and People 202 generally provide an aesthetic appeal to the virtual vehicle operating environment 120. They also may have characteristics that include decelerating the vehicle if collided with or entered. People 202 may have a characteristic to communicate, including providing instruction to a user, communicating messages of encouragement, or being a source of music. The virtual vehicle operating environment 120 also includes a vehicle position, vehicle orientation, vehicle velocity and vehicle acceleration.

Figure 3:
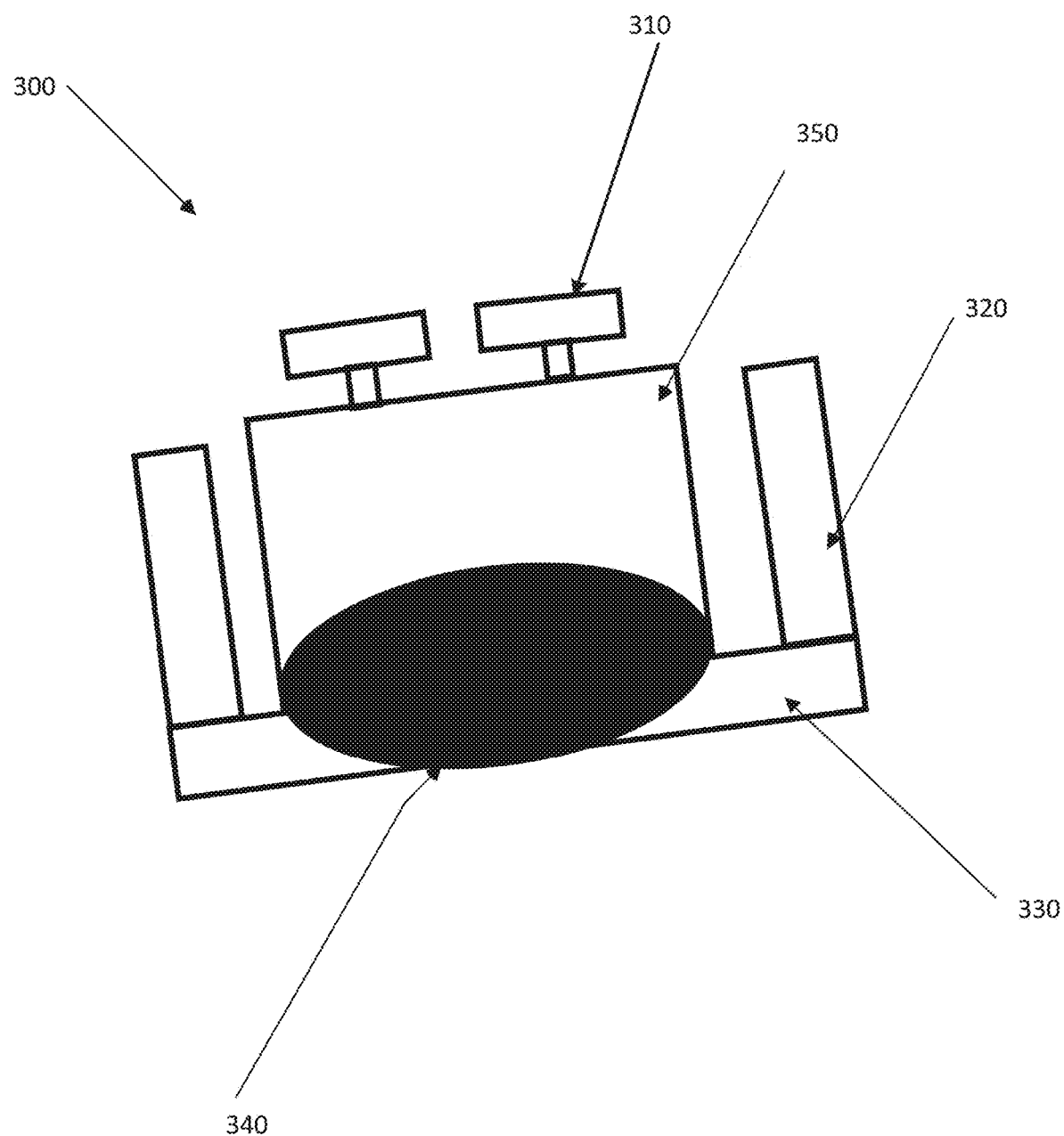
FIG. 3 is an illustration of an embodiment of a user-operated vehicle in a virtual vehicle operating environment.

Referring to FIG. 2 and FIG. 3, exemplary User Operated Vehicle 300 is shown. User Operated Vehicle 300, shown in FIG. 3, may be simulated from the viewpoint of User 130. In this example, User Operated Vehicle 300 may be a wheelchair, and the viewpoint may be a first person view of User 130 sitting in the wheelchair. Other embodiments include viewpoints such as free roam, follow, follow-side on, and follow-overhead. User 130 may be able to see portions of the wheelchair that may include Armrest 320, Foot Rest 310, a portion of Frame 330, wheels (not shown), and a portion of Seat 350. The user may also be able to see a portion of Avatar 340 of themselves. Because the simulation is shown in VR from the viewpoint of User 130, User 130 may be able to navigate about Virtual Vehicle Operating Environment 120 with User Operated Vehicle 300 and interact with a feature by either avoiding collisions with a feature or intentionally running through, on or over features.

In an embodiment of the instant disclosure, User Operated Vehicle 300 has a plurality of wheels. User Operated Vehicle 300 may have a different simulated experience if User Operated Vehicle 300 has less than all of the wheels interact with a feature than it would if all of the wheels were to interact with a feature.

In an embodiment, if a vehicle were to have one of two propelling wheels interact with an adverse ground condition such as gravel, oil slicks, or water, a differential would be created where the adversely affected wheel would slip and propel the vehicle less than the non-affected wheel. This may cause the vehicle to turn in the direction of the adversely affected wheel. The amount of turning may be proportional to the amount of relative slippage experienced between the two propelling wheels.

In an embodiment, User Operated Vehicle 300 has different simulated wheel types. Examples of vehicles having different wheel types include tractors, exotic cars, shopping carts, and wheelchairs. Examples of different wheel types include size of the wheels and attachment type. Wheel size in Virtual Vehicle Operating Environment 120 may be measured by the diameter of the wheel.

Figure 4:
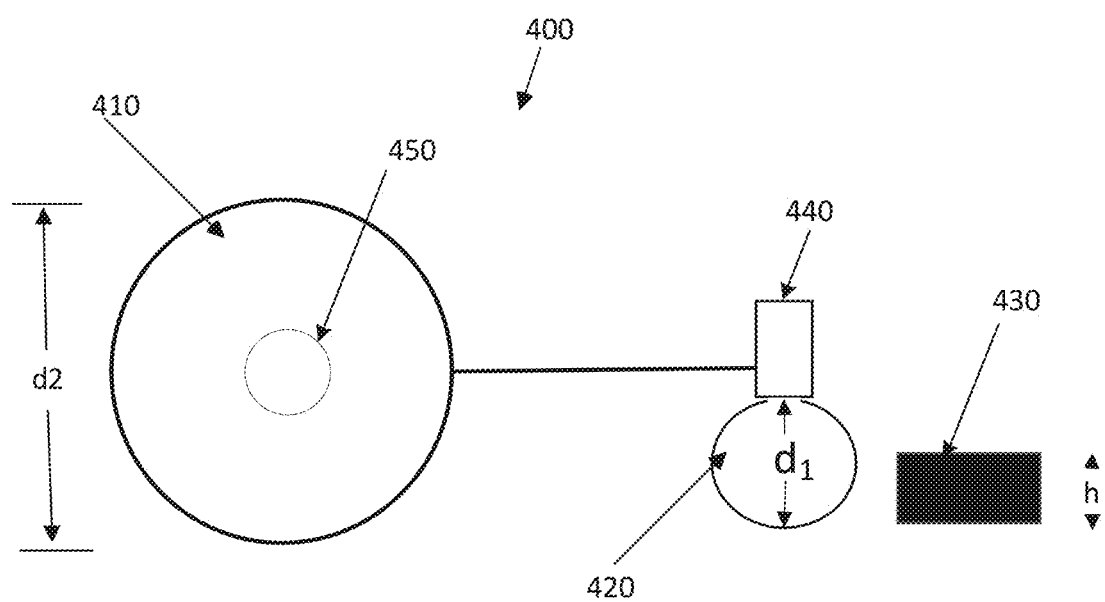
FIG. 4 is an illustration of an embodiment of a vehicle and a block feature.

Referring to FIG. 4, Vehicle 400 is shown. Vehicle 400 may experience a different acceleration and deceleration when interacting with a feature depending on a size of the wheel that interacts with the feature. A representative Wheelchair 400 is shown, which has two different wheels sizes. Rear Wheel 410 is larger than Front Wheel 420 since d2 is larger than d1. To simulate the physical world, Front Wheel 420 would have a more difficult time rolling over Block 430 because of the relative height of Front Wheel 420 and the height h of Block 430.

In comparison, Rear Wheel 410 would have an easier time (less deceleration) rolling over Block 430 because the diameter d2 is comparatively larger than h. Block 430 can be used to simulate real-life objects such as a curb or uneven cement. A user can choose to roll over Block 430 by going forward or backward by weighing which wheels are desired to roll over Block 430.

In an embodiment, the attachment types of Rear Wheel 410 and Front Wheel 420 differ. One example of an attachment type is an axle interface where Rear Wheel 410 has Axle 450 extending horizontally to couple to Frame 440, a frame interface, or a drive mechanism. Another example of an attachment type is a caster in which a yoke is used to attach Front Wheel 420 to the vehicle to frame 440 or a frame interface. The yoke may have a vertically extending member (not shown) that interfaces with the frame 440 or a frame interface. The caster may be rigid, i.e., may not allow Front Wheel 420 to rotate about the vertical axis or swivel where Front Wheel 420 may rotate about the vertical axis.

Figure 5A:
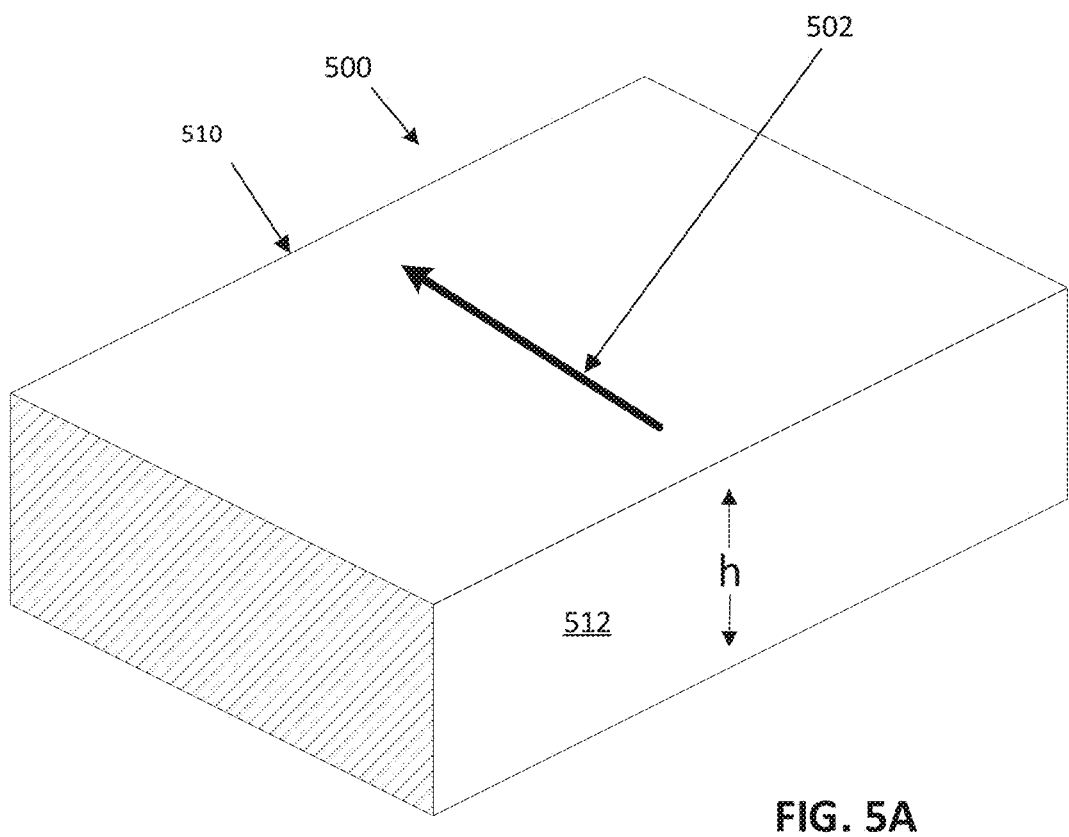
FIG. 5A is an illustration of an embodiment of a block.
Figure 5B:
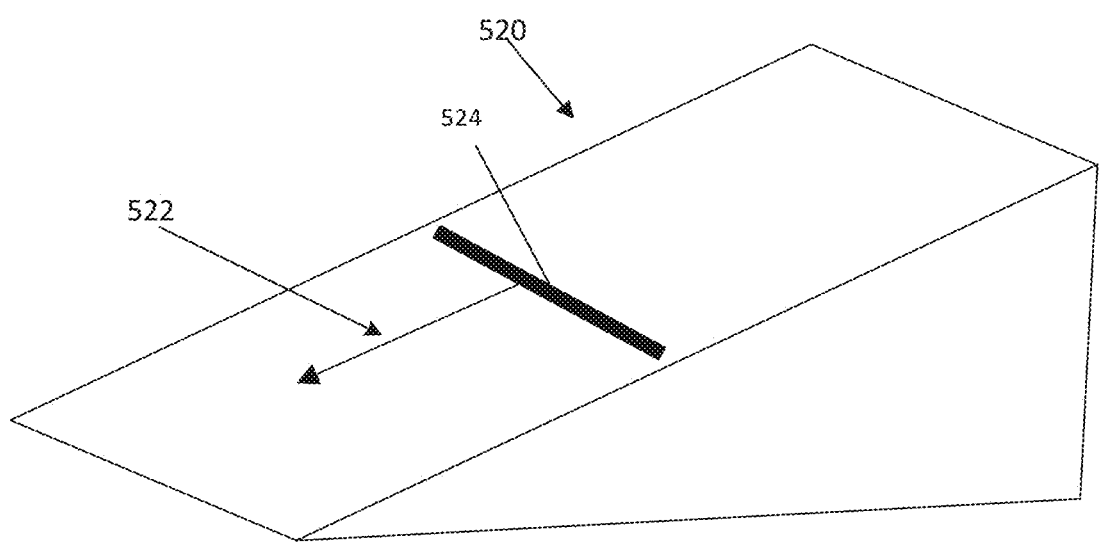
FIG. 5B is an illustration of an embodiment of a ramp.

FIGS. 5A and 5B illustrate Block 214 and Ramp 520, respectively. In FIG. 5A, a direction of travel is indicated by Arrow 502, and in FIG. 5B by Arrow 522. Block 214 may have Front Side 512 and Back Side 510. When User Operated Vehicle 300 rolls up onto Block 214 from Front Side 512, User Operated Vehicle 300 may experience a deceleration as it moves upward on Block 214. Correspondingly, User Operated Vehicle 300 may experience an acceleration when moving downward on Back Side 510 as it completes its movement over and off Block 214.

Referring to FIG. 5B, the ramp may cause a deceleration to User Operated Vehicle 300 when going up the ramp in the opposite direction of Arrow 522 and acceleration when going down the ramp in the same direction as Arrow 522. Arrow 522 is aligned along a longitudinal direction of the ramp, while Line 524 extends along a lateral direction.

Figure 6A:
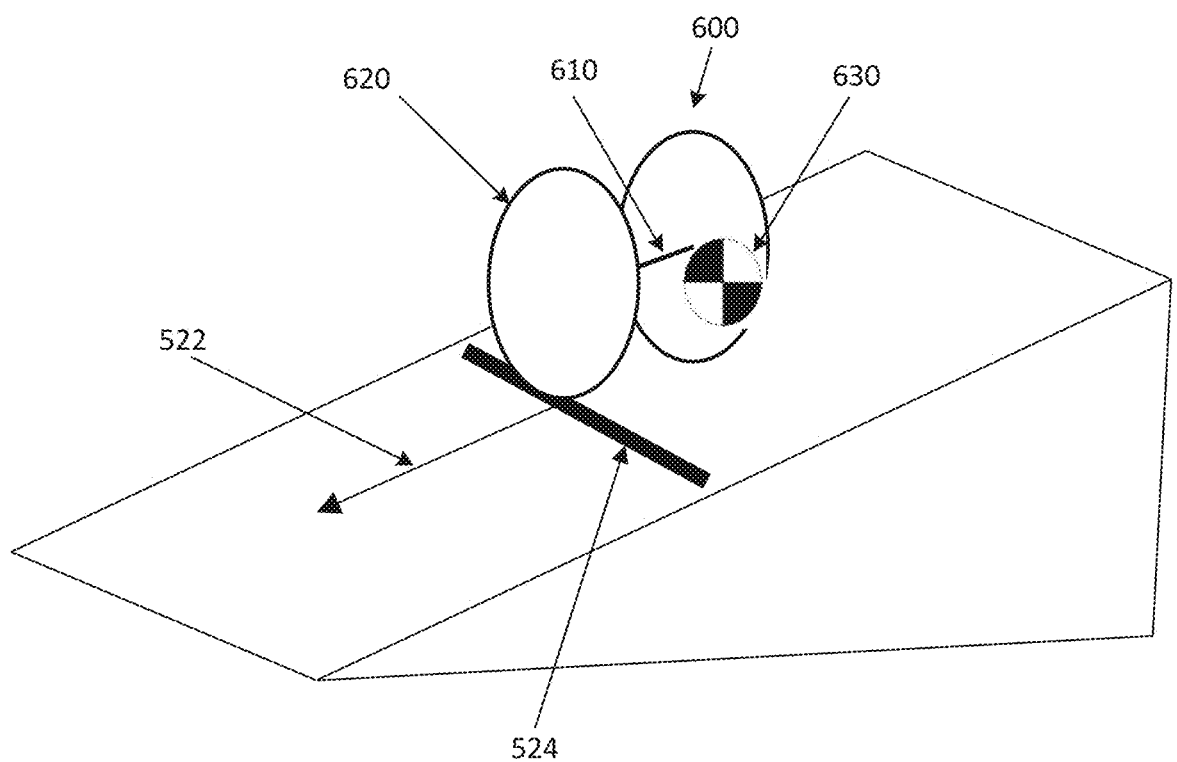
FIG. 6A is an illustration of an embodiment of a vehicle and a ramp.

Referring to FIG. 6A, Vehicle 600 with two sets of wheels is partially illustrated. Vehicle 600 may have a pair of Axle-Coupled Wheels 620 attached to Frame 610. Center of Gravity 630 is illustrated to the right of Axle-Coupled Wheels 620. A pair of swivel caster wheels (not shown) may be located opposite from Axle-Coupled Wheels 620 about Center of Gravity 630. Swivel caster wheels may be designed to rotate about their z-axis with a low amount of friction and thus do not resist rotation of the vehicle. In an embodiment, a drivetrain (not shown) is able to provide motive power to the Axle-Coupled Wheels 620.

A side slope calculation is determined by Center of Gravity 630 being offset from Axle-Coupled Wheels 620. The offset distance from a portion of the wheel creates a moment arm applying a rotational force, so Vehicle 600 turns downward and subsequently moves with the casters forward, down the slope. A portion of the wheel can include a center of the wheel and a contact point of the wheel to a ground surface. Other parts of the wheel may be used for ease of calculation. If Vehicle 600 is a wheelchair and User 300 wishes to remain in the shown position, User 130 may learn to counter this natural rotation of the wheelchair to turn down the slope. Virtual Vehicle Operating Environment 120 may simulate these conditions. User 130 may use User Interface 112 to train to counter the rotation and may develop skills for the situation in Physical Environment 100. One such method may include holding one or more of the rear wheels so that they do not move forward and rotate. Another method may include simultaneously applying propulsive forward or rearward forces to one or more of the rear wheels to maintain a laterally pointing direction. In one example, one or more wheels have a forward propulsive force applied, while also having one or more wheels having a rearword forces applied at the same time.

Figure 6B:
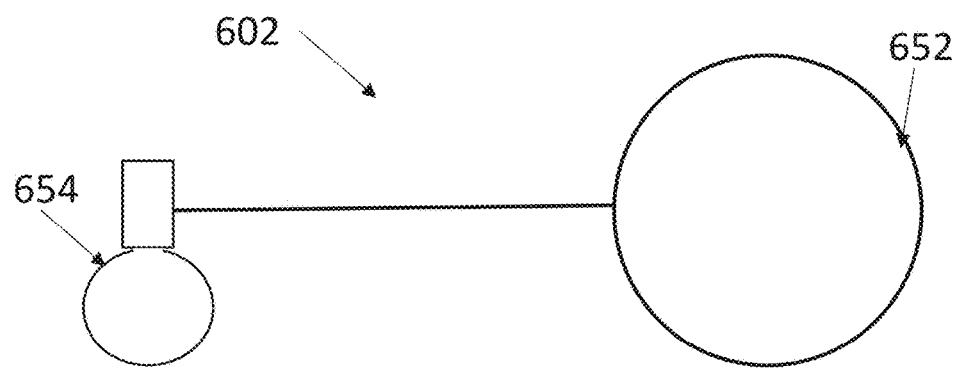
FIG. 6B is an illustration of an embodiment of a vehicle having a drivetrain location.
Figure 6C:
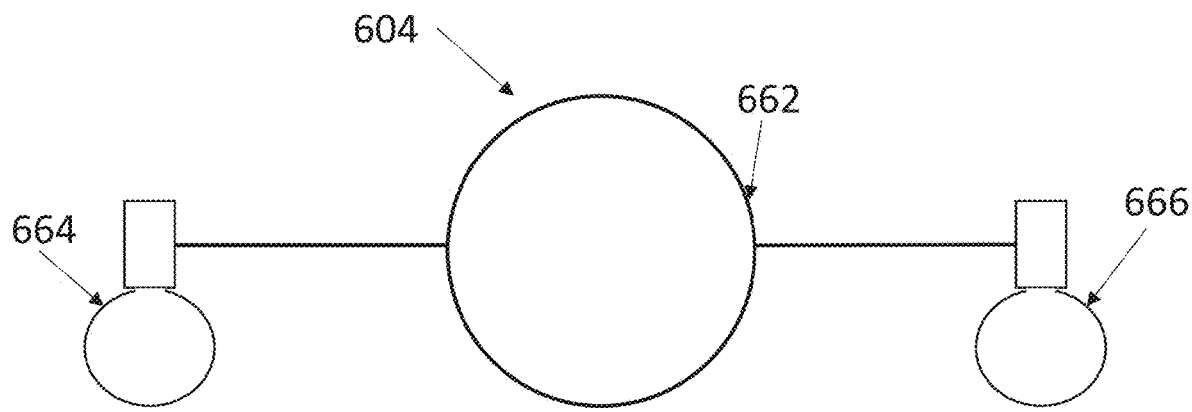
FIG. 6C is an illustration of another embodiment of a vehicle having a drivetrain location.

FIGS. 6B and 6C, each show an embodiment of drivetrain locations for Vehicle 602 and Vehicle 604, respectively. In FIG. 6B, an embodiment is shown where a Larger Pair of Wheels 652 are located forward of a Smaller Pair of Rear Wheels 654. Motive power is provided by a drivetrain (not shown) to the Larger Pair of Wheels 652 or directly to the Larger Pair of Wheels 65. With regards to the scenario described in FIG. 4, rolling over Block 430 would have less deceleration with the Larger Pair of Wheels 652 than with the Smaller Pair of Rear Wheels 654. With regards to the scenario described in FIG. 6A, User 130 would counter rotation of Vehicle 602 using methods that may include holding one or more of the Larger Pair of Wheels 652 so that they do not move forward and rotate. Another method may include applying propulsive forward or rearward forces to one or more of the Larger Pair of Wheels 652 to maintain a laterally pointing direction.

In FIG. 6C, an embodiment of Vehicle 604 is shown where a Middle Pair of Wheels 662 are located between pairs of Sets of Smaller Wheels 664, 666. Motive power is provided by a drivetrain (not shown) to the Middle Pair of Wheels 662. With regards to the scenario described in FIG. 6A, User 130 would counter rotation of Vehicle 604 using methods that may include holding one or more of the Middle Pair of Wheels 662 so that they do not move forward and rotate. Another method may include applying propulsive forward or rearward forces to one or more of the Middle Pair of Wheels 662 to maintain a laterally pointing direction.

In an embodiment, the Virtual Vehicle Operating Environment 120 may include a game system which can be any of the following: a racing game, Task 128, and a bowling game. In a racing game, the user vehicle may race against a predetermined time limit or another vehicle to reach a destination. Power-ups may also be used to set intermediate time goals. The power-ups may be visible or invisible to the user and promote driving along an ideal pathway. In Task 128, a certain task requiring maneuvering the vehicle may be required to complete the task. Tasks 128 can include transitioning from a road to a sidewalk, which may involve going over Block 214, or performing side slope maneuvers on a ramp. A bowling game may require User 130 to maneuver User Operated Vehicle 300 to contact a bowling ball, which may cause it to roll in a desired direction. The rolling of the bowling ball may then perform Tasks 128 such as knocking down bowling pins or interacting with other Features 122.

The Interactive Vehicle Simulation System 110 may record data such as statistics to track performance of a user. The recorded statistics may include time to complete, number of attempts, number of collisions with features, average vehicle acceleration, average vehicle braking distance, average vehicle turning speed, average vehicle turning radius, average vehicle approach velocity and pathing analysis which compares an ideal pathing with the user pathing. For the pathing analysis, a scoring can factor in distance of deviations, area of deviations and time of deviations. Visible or invisible tracking points may be used to determine the recorded statistics by measuring the statistics relative to the tracking points. The tracking points may also operate as triggers for such things as events.

In an embodiment, Interactive Vehicle Simulation System 110 may record data that includes whether features are gazed at and the linger time at which the object is gazed at. Multiple gaze categories include distractions, important, or not-tracked. The recorded data is used to determine the amount of time User 130 is focusing on important items and distractions. Features can be categorized by using tags. Eye tracking technologies that may be used include measurement of the movement of an object attached to the eye, image capture of the eye, measurement of electric potentials using electrodes placed around the eyes and ray casting from an area around the eyes of User 130 including a headset.

As discussed previously, Virtual Reality Engine 118 can be stored in a processor-readable non-transitory storage media. Virtual Reality Engine 118 may include a display engine for generating visual images by utilizing Processor 116 and Display 114, which may have a ninety-degree or greater, field of view on a display. When using Processor 116, Virtual Reality Engine 118 generates instructions for displaying Virtual Vehicle Operating Environment 120. Virtual Vehicle Operating Environment 120 may include at least a portion of User Operated Vehicle 300, which may have a plurality of wheel types, a vehicle position, vehicle orientation, vehicle velocity and vehicle acceleration.

The processor-readable non-transitory storage media may include Virtual Vehicle Operating Environment 120 with features comprising one or more of the following: People 202, Doors 204, Roads 206, Rivers 208, Ground Conditions 210, Walls 212, Blocks 214, Ramps 216, and Bridges 218. Other features included but not shown are lifts, escalators, elevators, vegetation, rocks, garbage cans, machines, aquariums and tables.

In an embodiment, the ramp feature, when virtually interacted with, may cause a deceleration to the vehicle when going up the ramp and acceleration when going down the ramp. In an embodiment, the vehicle has a rotational force applied based on a side slope calculation. In an embodiment, Block 214 may cause a deceleration when moving upward on Block 214 and acceleration when moving downward on Block 214.

The processor-readable non-transitory storage media, in an embodiment, can simulate a situation where less than all of the wheels of the vehicle experiences an interaction with a feature. In another embodiment, the vehicle experiences a different acceleration and deceleration depending on the size of the wheel interacting with an environmental feature.

In an embodiment, the processor-readable non-transitory storage media may include Virtual Vehicle Operating Environment 120, which may comprise one or more of the following Games 126: a racing game, Task 128, and a bowling game. In an embodiment, statistics are recorded, including time to complete, number of attempts, number of collisions with features, average vehicle acceleration, average vehicle braking distance, average vehicle turning speed, average vehicle turning radius, and average vehicle approach velocity.

Figure 7:
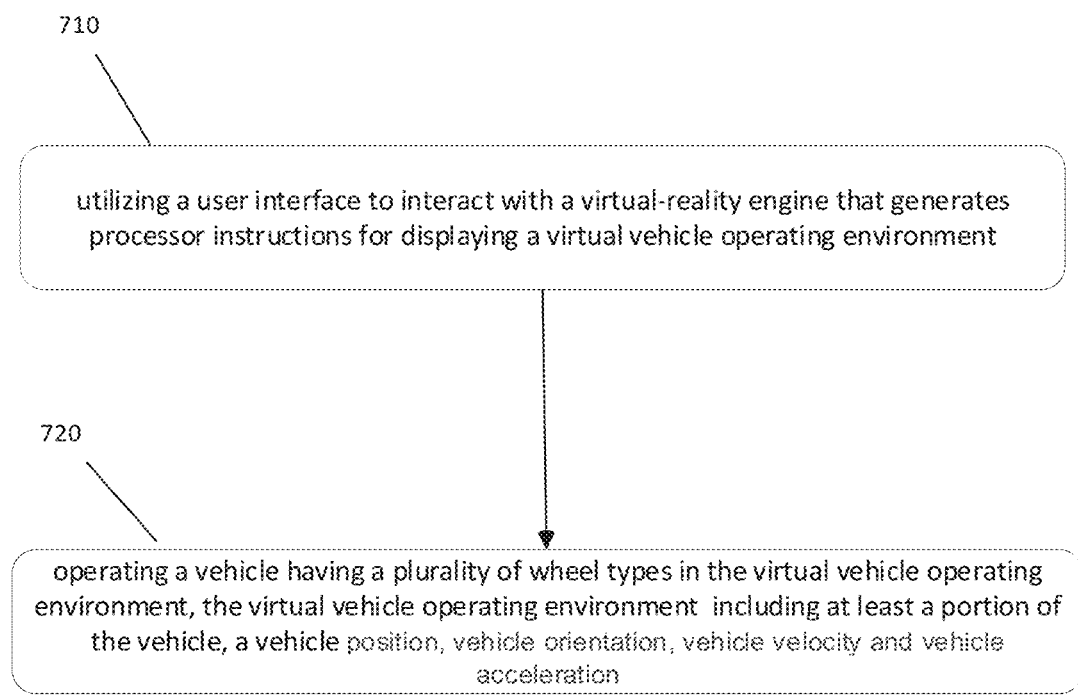
FIG. 7 is an illustration of a method for operating an interactive vehicle simulation system.

FIG. 7 illustrates an embodiment of a method of operating Interactive Vehicle Simulation System 110 comprising: utilizing 710 a user interface to interact with a virtual reality engine that generates processor instructions for displaying Virtual Vehicle Operating Environment 120 and operating 720 a vehicle having a plurality of wheel types in Virtual Vehicle Operating Environment 120. Virtual Vehicle Operating Environment 120 may include at least a portion of the vehicle, a vehicle position, vehicle orientation, vehicle velocity, and vehicle acceleration.

A further embodiment of a method of operating Interactive Vehicle Simulation System 110 comprises Virtual Vehicle Operating Environment 120, including features comprising one or more of the following: People 202, Doors 204, Roads 206, Rivers 208, Ground Conditions 210, Walls 212, Blocks 214, Ramps 216, and Bridges 218. In an embodiment, the method of operating an interactive vehicle simulation system further comprises virtually interacting with a ramp feature that causes a deceleration to the vehicle when going up the ramp and acceleration when going down the ramp. In an embodiment, Block 214 feature causes a deceleration to the vehicle when moving upward on Block 214 and acceleration when moving downward on Block 214.

A further embodiment of a method of operating Interactive Vehicle Simulation System 110 comprises Virtual Vehicle Operating Environment 120 that may include one or more of the following Games 126: a racing game, a Task 128, and a bowling game.

Another embodiment of a method of operating Interactive Vehicle Simulation System 110 comprises Virtual Vehicle Operating Environment 120 that includes having the vehicle virtually interact with a feature with less than all of the wheels. In an embodiment, the vehicle experiences a different acceleration and deceleration depending on the size of a wheel interacting with an environmental feature.

In one embodiment for a method of operating Interactive Vehicle Simulation System 110, a User 130 counteracts the effects of a side slope rotational force by applying more power or force to one wheel than to another.

In an embodiment, a method of operating Interactive Vehicle Simulation System 110 comprises utilizing a pair of user interface hand controllers to interact with a corresponding pair of virtual wheels and where movement of a hand controller results in a complementary movement of a corresponding virtual wheel. In an embodiment, a user interface includes any of a rollerball, a touchpad, and a joystick. In an embodiment, one or more active LED markers are incorporated into the upper $1/3^{rd}$ of a joystick and the base comprises a portion of wheelchair such as an armrest.

In an embodiment, the method of operating Interactive Vehicle Simulation System 110 comprises wearing a headgear having a display with a ninety-degree field of view or greater.

In an embodiment, the method of operating Interactive Vehicle Simulation System 110 comprises recording statistics including time to complete, number of attempts and number of collisions with features, average vehicle acceleration, average vehicle braking distance, average vehicle turning speed, average vehicle turning radius, and average vehicle approach velocity.

Various embodiments of Interactive Vehicle Simulation Systems 110 have been described herein. In general, features described in connection with one particular embodiment may be used in other embodiments unless context dictates otherwise. For example, the user-operated vehicle described in connection with FIG. 3 may interact with Features 122 described in FIGS. 2, 4, 5A, 5B, and 6 while also being employed using the method of operation depicted FIG. 7. For the sake of brevity, descriptions of such features have not been repeated, but will be understood to be included in different aspects and embodiments described herein.

While various aspects and embodiments have been disclosed herein, other aspects and embodiments will be apparent to those skilled in the art. The various aspects and embodiments disclosed herein are for purposes of illustration and are not intended to be limiting

The invention claimed is:

1. An interactive vehicle simulation system comprising:
   a processor;
   a display having a ninety-degree field of view or greater;
   a virtual reality engine that generates, by utilizing the processor, instructions for displaying a virtual vehicle operating environment;
   a virtual vehicle operating environment including at least a portion of a user-operated vehicle having a plurality of wheel types, a vehicle position, vehicle orientation, vehicle velocity, and vehicle acceleration, wherein statistics are recorded, including time to complete, number of attempts, number of collisions with features, average vehicle acceleration, average vehicle braking distance, average vehicle turning speed, average vehicle turning radius and average vehicle approach velocity; and a user interface for operatively controlling the user-operated vehicle.

\* \* \* \* \*